United States Patent [19]
Song et al.

[11] Patent Number: 5,447,565
[45] Date of Patent: Sep. 5, 1995

[54] APPARATUS AND METHOD FOR COATING PARTICLES

[75] Inventors: Joo H. Song, Northbrook; Donald J. Townsend, Chicago, both of Ill.

[73] Assignee: Wm. Wrigley Jr. Company, Chicago, Ill.

[21] Appl. No.: 165,727

[22] Filed: Dec. 10, 1993

[51] Int. Cl.⁶ .................. B05B 7/16; B05B 15/00; B05B 17/00; B05C 5/00
[52] U.S. Cl. ...................... 118/17; 118/19; 118/70; 118/302; 118/303; 118/320; 118/600; 427/212; 427/422
[58] Field of Search .................. 118/17, 19, 20, 24, 118/302, 303, 320, 70, 600; 427/422, 212, 445

[56] References Cited
U.S. PATENT DOCUMENTS

| | | |
|---|---|---|
| 4,275,682 | 6/1981 | Weber .................. 118/303 |
| 4,398,493 | 8/1983 | Gillett et al. .......... 118/303 |
| 4,407,217 | 10/1983 | Jackson ............... 118/303 |
| 4,596,206 | 6/1986 | Berge et al. .......... 118/303 |
| 4,675,140 | 6/1987 | Sparks et al. . | |
| 4,689,249 | 8/1987 | Thygesen ............. 118/303 |
| 5,019,302 | 5/1991 | Sparks et al. . | |

Primary Examiner—W. Gary Jones
Assistant Examiner—Steven P. Griffin
Attorney, Agent, or Firm—Hill, Steadman & Simpson

[57] ABSTRACT

Methods and apparatus for coating materials are provided. The apparatus includes a first member located above a rotating member and including a top opening and a bottom opening. A second member is located at least partly within the first member including a bottom opening and a closed top portion. A feeder for feeding the first material through the top opening of the first member is provided. A second feeder for feeding the second material.

17 Claims, 5 Drawing Sheets

APPARATUS AND METHOD FOR COATING PARTICLES

BACKGROUND OF THE INVENTION

The present invention relates generally to methods and apparatus for coating materials. More specifically, the present invention relates to improved spray chilling methods and apparatus for encapsulating particles.

It is known to coat, or encapsulate, particles or liquid droplets with a material. The coating or encapsulation of particles is widely employed for a variety of purposes. It is known to coat particles to: to protect the coated substances from environmental effects; control release time; provide improved handling characteristics; and/or provide additional characteristics or attributes to the coated material. In this regard, a number of products can be coated including, for example: medicaments; pesticides; dyes; and food stuffs. Likewise, a number of products include ingredients that are coated or encapsulated including confectioneries such as chewing gum that may include, for example, encapsulated flavors or sweeteners.

It is likewise known to agglomerate smaller particles into larger particles. Through agglomeration, small fine particles can be made into larger masses.

There are numerous coating or encapsulation, as well as agglomeration techniques that can be used to coat materials or to agglomerate smaller or finer particles into relatively larger sized masses. U.S. Pat. Nos. 4,675,140 and 5,019,302 describe such techniques.

U.S. Pat. Nos. 4,675,140 and 5,019,302 each note in the background section the disadvantages of many current encapsulation and agglomeration techniques. These disadvantages include: high costs; inapplicability for coating particles smaller than 200 microns in diameter; complexity; long contact time between the core and coating material prior to solidification of the coating material; inability to achieve wetting and coating of the core particles with the desired coating materials; inefficient separation of coated particles from unused coating material; and an inefficient usage or wastage of coating material. (See U.S. Pat. No. 4,675,140, lines 29–42.) Likewise, U.S. Pat. No. 5,019,302 notes various problems with many methods and apparatus employed for granulation or agglomeration.

In an attempt to overcome the disadvantages of the prior art, spray chilling encapsulation techniques have been developed. Generally, spray chilling involves atomizing a suspension with subsequent solidification of the droplets by cooling. Spray chilling is an effective encapsulation technique, but suffers from several drawbacks and limitations. Some spray chilling techniques involve dropping the active agent and encapsulant on a spinning disk. However, it has been found that if the active agent and encapsulant are simultaneously dropped on a spinning disk, poor quality encapsulation can result.

U.S. Pat. Nos. 4,675,140 and 5,019,302 provide methods involving mixing an active ingredient with a molten encapsulant and dropping same on a spinning disk.

To this end, U.S. Pat. No. 4,675,140 discloses a method and apparatus wherein solid particles or liquid droplets of a core material to be coated are initially dispersed in a molten coating material to form a suspension. The suspension of the two materials is then fed to the surface of a rotating disc. The centrifugal forces imposed on the suspension by the rotating disc cause the suspension to spread towards the disc periphery with progressive thinning out of the liquid and separation of excess coating material from the coated particles. Large coated particles are created and smaller-size atomized droplets of excess coating material are formed by atomization of the thin film of liquid coating at the periphery of the disc.

U.S. Pat. No. 5,019,302 discloses a method wherein agglomerates are produced from a powdered feed material by feeding a powdery material to be granulated into a meltable binder material. The materials are then fed to the surface of a rotating spreader, which is heated to a temperature above the melting point of the feed material. The particle mass is dispersed from the edge of the spreader into an atmosphere cooler than the melting temperature to form a granulated mass. Individual granules are generated that contain a core of the original powdered material.

A disadvantage with methods that mix the active agent into the molten encapsulant is that high heat history can damage the active agent. Due to heat history problems, such typical spray chilling systems use encapsulants with low melting points, such as low molecular weight waxes.

A further problem with some spray chilling techniques is that they drop the material in the center of the rotating disk. If the material is dropped in the exact center of the rotating disk, because there is no angular velocity at that point, the material can remain there, building up until it is spun off of the rotating disk as an agglomerated mass.

Feed systems have been developed to attempt to drop material into an off center position on the rotating disk. Even with such systems, some material can still land in the center of the rotating disk.

Due to the problems that are incurred when the active agent and encapsulant are simultaneously dropped, there have been attempts at dropping particles and encapsulants separately onto the rotating disk. However, in current systems, the problem with such a design is that air currents from the disk cause powder to be blown away. This can result in uncoated particles, as well as loss of product.

There is therefore a need for an improved system and apparatus for encapsulating particles.

SUMMARY OF THE INVENTION

The present invention provides an improved apparatus and system for coating or encapsulating particles. The system is designed so that it can be adapted for use with any spray chilling system employing a rotating disk atomizer.

To this end, in an embodiment, an apparatus for use in coating a first material with a second material is provided. The apparatus comprises a first member located above a rotating member and including a top opening and a bottom opening. A second member is located at least partly within the first member and includes a bottom opening and a closed top portion. A feeder for feeding the first material through the top opening of the first member is provided. The apparatus includes a second feeder for feeding the second material into an interior of the second member.

In an embodiment, the first member has an elongated cylindrical shape.

In an embodiment, the second member has a cone shape.

In an embodiment, the second feeder is coupled to means for heating the second material.

In an embodiment, the first member has a generally elongated cylindrical structure including a flared portion that defines the bottom opening.

In an embodiment, the apparatus includes means for wiping a portion of the interior wall of the first member. Preferably, the means for wiping includes at least one blade that rotates around the portion of the interior of the first member.

In an embodiment, the apparatus includes a third member located at least partly within the second member, the third member having an interior and defining a bottom opening, the second feeder is located so as to be in fluid communication with the interior of the third member. In a preferred embodiment, the third member has a substantially truncated cone shape.

In another embodiment, the present invention provides an apparatus for use in coating a first material with a second molten material. The apparatus includes an elongated cylindrical member having a top opening and a bottom opening. A second member is located at least partially within the elongated cylindrical member and has a substantially cone shape including a bottom opening. A first feeder for feeding the first material through the top opening is provided, as well as a second feeder that is located at least partially within the second member for feeding the second material.

The present invention also provides a method for coating a first material with a second material. The method comprises the steps of: providing a first member that includes a first opening and a second opening; positioning the first member over a rotating member; providing a second member within a portion of the first member; locating a feeder within the second member; feeding the first material into the top opening of the first member and onto the rotating member; and feeding the second material through the feeder.

An advantage of the present invention is that it provides an improved encapsulation technique.

A still further advantage of the present invention is that it provides an apparatus that can be used to provide for a more effective encapsulation of particles.

Moreover, an advantage of the present invention is that it provides an improved system and apparatus for encapsulating particles for use in confectionery products.

Another advantage of the present invention is that it provides a system wherein heat exposure of the active agent is reduced because the agent is not premixed with the molten encapsulant.

Furthermore, an advantage of the present invention is that it provides an apparatus wherein build up in the center of the disk is reduced or eliminated as material is deposited at a distance from the center.

Still another advantage of the present invention is to provide improved coating of large irregularly shaped particles.

Further, an advantage of the present invention is that problems with blown away powder are greatly reduced or eliminated with the apparatus of the present invention.

Moreover, an advantage of the present invention is that with the apparatus of the present invention coating is more efficiently applied resulting in a more thorough and even coating of particles.

Another advantage of the present invention is that it provides an apparatus and system that insures that fewer uncoated particles are created.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides improved apparatus and methods for encapsulating or coating a first material with a second material. As used herein, the term "coating" refers to the encapsulation, agglomeration, and/or granulation of a first material with a second material or itself. Preferably, the first material is a particle and the second material is a molten compound.

Figures 1, 2:
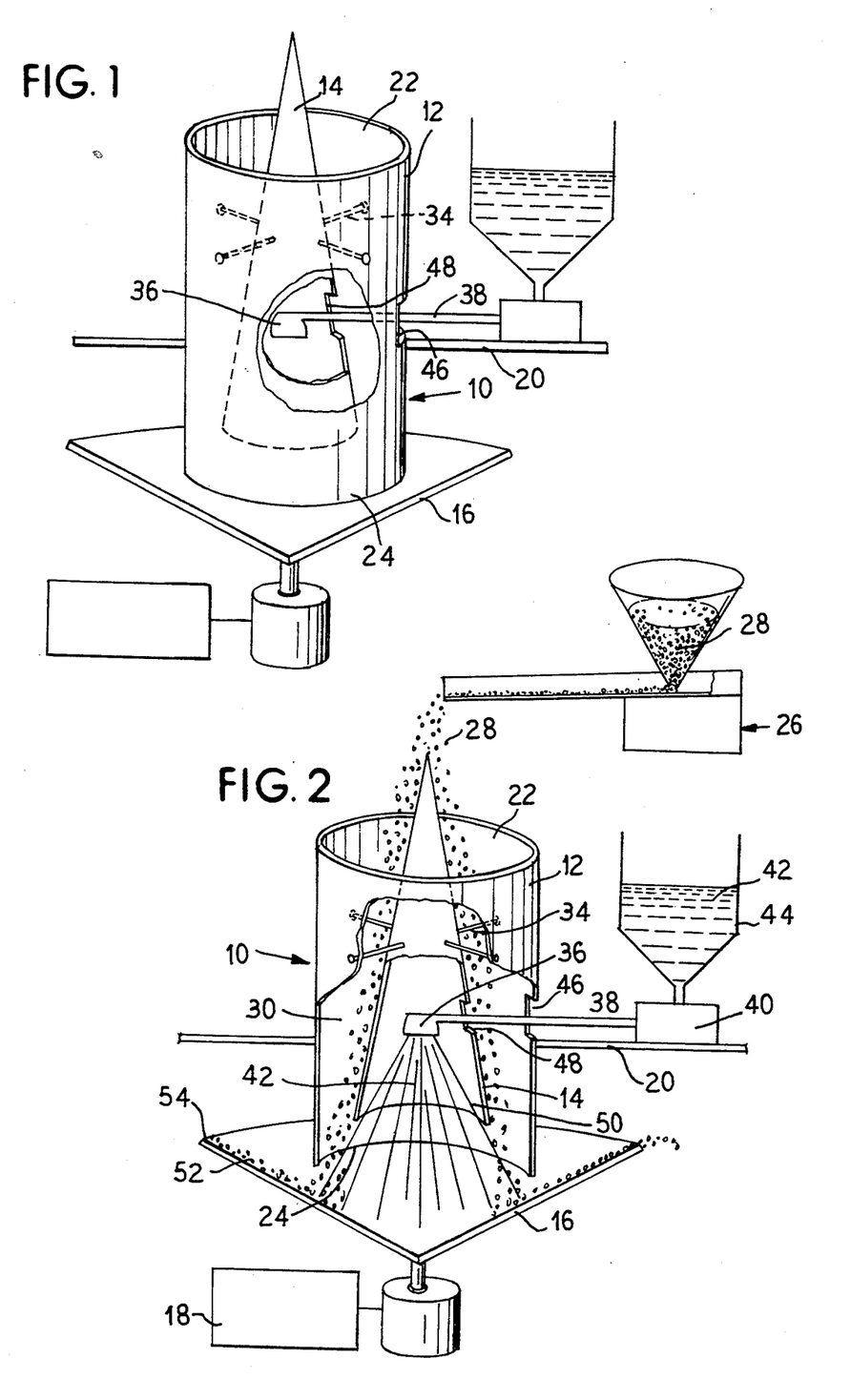
FIG. 1 illustrates a perspective view with portions broken away of an embodiment of the apparatus of the present invention.
FIG. 2 illustrates schematically the operation of the embodiment of the apparatus of FIG. 1.

Referring now to FIGS. 1 and 2, an embodiment of the present invention is illustrated. The apparatus 10 includes a first member 12 and a second member 14. Preferably, the first member. 12 has an elongated cylindrical shape. However, other shapes can be utilized. The first member 12 is supported above a rotating member 16. Preferably, the rotating member 16 is a spinning disk such as is known in the art. To rotate the disk, a motor 18 or other means is provided.

The first member 12 is supported above the disk 16 by a support member 20 above the rotating disk. Of course, a variety of means and methods can be used to support the first member 12 above the rotating disk 16.

The first member 12 includes a top opening 22 and a bottom opening 24. As illustrated in FIG. 2, a feeder 26 is located above the top opening 22 of the first member 12. It should be appreciated that any device that can feed a material can be used as known in the art.

Generally, the feeder 26 will feed solid particles 28 through the top opening 22 of the first member 12. The particles 28 will then fall within the interior 30 of the first member 12 and through the bottom opening 24 onto the spinning disk 16.

Located at least partially within the first member 12 is the second member 14. In the preferred embodiment illustrated, the second member 14 has a substantially cone-like shape. The second member 14 is secured within the first member 12 utilizing supports 34. Of course, other means for supporting the second member 14 within the first member 12 can be used. As illustrated, preferably, the top portion of the second member 14 extends through the top opening 22 of the first member 12. However, if desired, the top portion of the second member 32 can be located within the first member 12.

Located within the second member 14, in the preferred embodiment illustrated, is a spray nozzle 36. The spray nozzle 36 is coupled to a feed line 38 that feeds, through the use of a pump 40, a second material 42 to the spray nozzle 36. Preferably, in the embodiment illustrated, the second material 42 is in a molten state. To achieve this state, the second material 42 is housed within a container 44 that is heated.

Preferably, each of the first and second members 12 and 14, respectively, include apertures 46 and 48 for receiving the feed line 38. If desired, the apertures 46 and 48 can be sealed so as to prevent material from exiting the apertures.

In an embodiment, the apertures 46 and 48 in the first member and the second member 12 and 14, respectively, are elongated vertically to allow vertical adjustment of the feed line 38 and thereby spray nozzle 36. If desired, one or both of the openings can be equipped with sliding gates to close off the opening around the feed line.

In use, the feeder 26 feeds the first material 28 through the first member 12. The first material 28 falls through the top opening 22 of the first member 12, through the interior 30 of the first member 12 possibly aided by downward air currents which are created by the spinning disk 16. At the same time, the molten material 42 is sprayed through the spray nozzle 36 into an interior 50 of the second member 32. As illustrated, the nozzle 36 sprays the material toward the disk 16.

The first material 28 as it is fed thereby falls through a cloud or spray of molten atomizing encapsulate second material 42 which is pumped through the spray nozzle 36. The particles of the first material 28 are thereby encapsulated by the second material 42 on the spinning disk 16. The resultant coated particles 52 then, due to centrifugal force, will be urged towards the edge 54 of the spinning disk 16 where they can be captured as they fall therefrom as is known in the art.

Figures 3, 4:
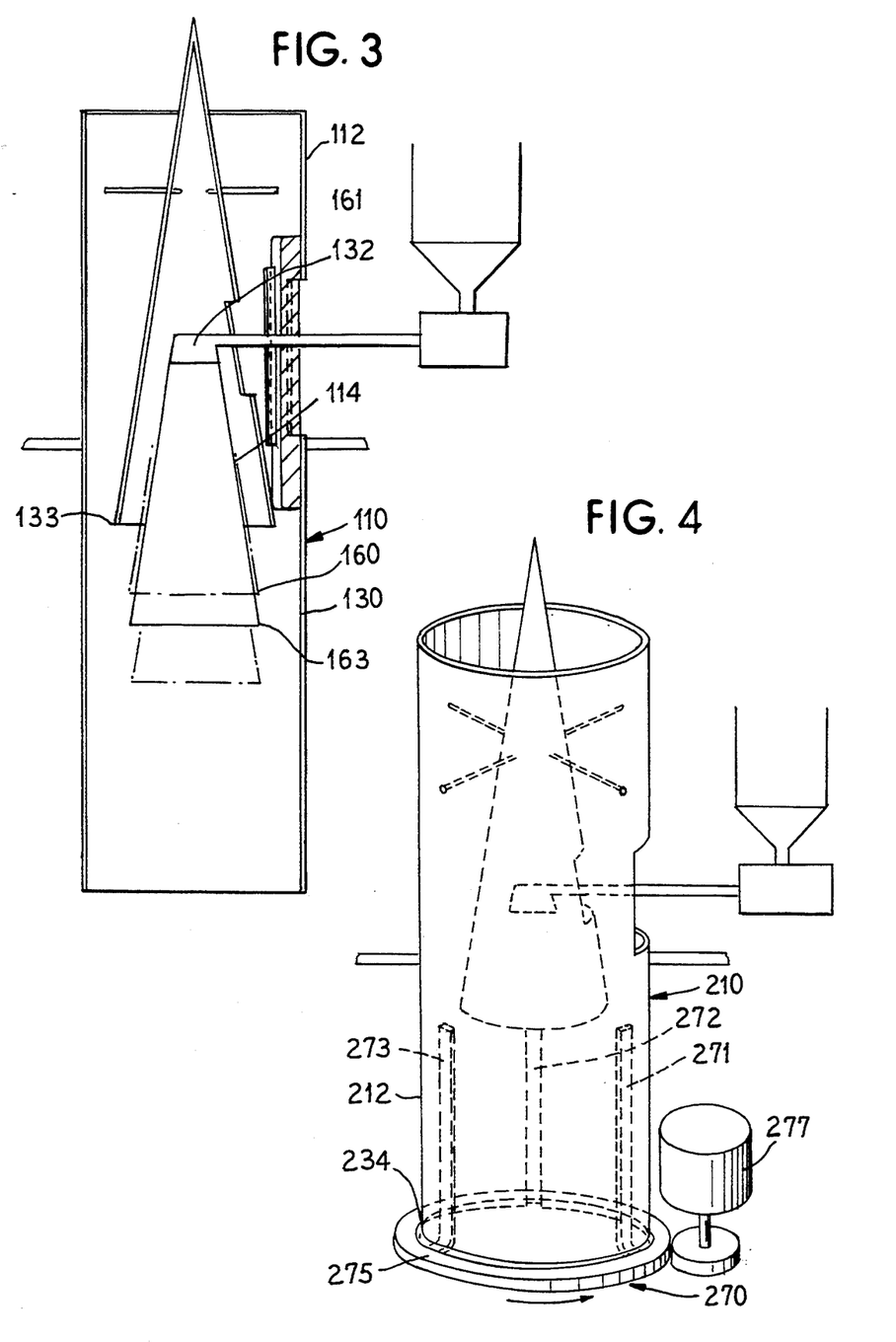
FIG. 3 illustrates a cross-sectional perspective view of another embodiment of the apparatus of the present invention.
FIG. 4 illustrates a perspective view of still another embodiment of the apparatus of the present invention.

Referring now to FIG. 3, an embodiment of the present invention is illustrated. In this embodiment, the device 110 includes a third member 160 that is coupled to the spray nozzle 132. Preferably, the third member 160 has a truncated cone shape. The truncated cone is located at least partially within the second member 114. If desired, the device 110 can be constructed so that the location of the third member 160 within the first member 112 is vertically adjustable. To this end, as illustrated in FIG. 3 a sliding gate 161 is provided. The gate 161 is moveable within the first member 112 and allows the third member to be vertically adjusted.

The third member 160 reduces turbulence of air passing through the apparatus 110. The third member 160 also reduces the heating of the second member 114 thereby reducing thermal exposure of the powdered first material that is fed through the first member 112.

A further advantage of this embodiment is that the third member 160 serves to reduce build-up of the first and second materials on the inner surface 130 of the first member 112. Preferably, the second and third member 114 and 160 are constructed so as to create only a small gap between the outer rims 133 and 163 of the second and third members 114 and 160 and the inner wall 130 of the first member 112. This is believed to create a venturi effect that enhances coating efficacy.

By way of example, and not limitation, dimensions for the embodiment of the device 110 illustrated in FIG. 3 will now be given. The first member 112 can have a height of 16 inches and a width at the base of 4.5 inches. The second member 114 can have a height of 10.5 inches and a width at the base of 2.75 inches. The third member 160 can have a height of 6 inches and a width at the base of 2.75 inches. It should be noted that these dimensions are preferably used with a 6 inch spinning disk.

FIG. 4 illustrates another embodiment of the apparatus 210 that is designed to reduce build-up. A wiper member 270 is positioned and rotatably mounted within the lower portion 234 of the first member 212. The wiper 270 is designed to wipe off build up of the first and/or second material from the interior of the first member 212.

Although three wiper blades 271, 272, and 273 are illustrated, more or less wiper blades can be used. The wiper blades 271, 272, and 273 are coupled to a frame 275 that is rotated by a motor 277.

If desired, additionally, or alternatively, the lower portion 234 of the member 212 can be heated. Additionally, in other embodiments of the apparatus, the inner wall of the first member may be coated with a non-stick coating such as Teflon. If desired, a vibrator can be attached to the first member and/or to the upper cone preferably at its pointed portion.

Figure 5:
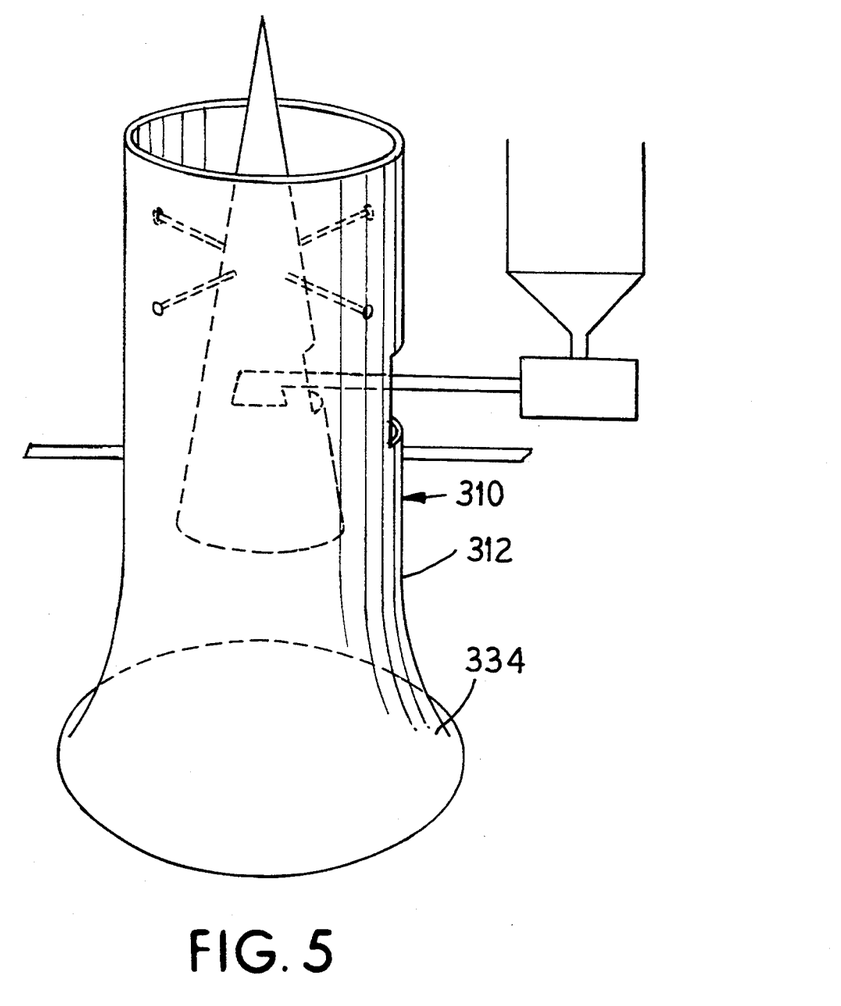
FIG. 5 illustrates a perspective view of a further embodiment of the present invention.

In another embodiment of the apparatus 310, the bottom portion 334 of the first member 312 may also be flared as illustrated in FIG. 5.

In another embodiment, one or both of the openings are equipped with sliding gates to close off the opening around the pipe.

In another embodiment of the present invention, air jets are located at the bottom of the first member. These air jets are directed upward to create a fluidized bed which suspends particles at the base of the first member for improved coating. Additionally, if desired, air jets can be used that point downward to create a forward current through process.

The present invention achieves many advantages over the prior art. Heat exposure of the active agent is reduced because it is not premixed with the molten encapsulant. Build-up in the center of the disk is reduced or eliminated as material is deposited at a distance from the center. Compared to merely dropping the active agent and encapsulant on the disk, the problems with blown away material of the powder are greatly reduced or eliminated. Additionally, the coating is more efficiently applied resulting in a more even coating with fewer uncoated particles.

By way of example, and not limitation, examples of the present invention will now be given:

EXAMPLE NO. 1

An extruded flavor delivery system was prepared according to the method disclosed in U.S. Pat. No. 5,128,155. The ingredient comprised an extruded mixture of 50% Klucel HF, 30% fumed silica (Sipernat 22 a product of DeGussa, Teterboro, N.J.) and 20% glycerol monostearate which was soaked overnight in peppermint oil equal to half its own weight. The resulting product which contained 33% flavor was sifted through a #20 mesh sieve.

A device substantially similar to that illustrated in FIG. 3 and having the dimensions described above was used to coat the flavor delivery particles with Starwax 100, a microcrystalline wax having a melting point of 190° F. from Petrolite, Tulsa, Okla.

The feeding apparatus of FIG. 3 was wrapped with heat tape that was connected to a Variac transformer that was set to 64%. A vibrator powered by a Variac that was set to 90% was also attached to the apparatus. The distance from the bottom of the third member to the bottom of the first member was adjusted to 5 inches.

A Nordson 2300 wax sprayer was used with 30 psi air pressure and a Nordson #002004 nozzle to spray the wax (at 230° F.). The flavor particles were delivered to the feeder by an AccuRate 300 series powder feeder (with a 1" diameter Acme thread helix with center rod machined polyethylene auger) set to 250.

A custom made laboratory spray chiller spinning disk manufactured by Southwest Research Institute of San Antonio, Tex. was used. This device was equipped with a heat ring under the disk which was set to maintain a temperature of 300° F. at the bottom of the disk. The disk itself was a six inch diameter concave hyperbolic shape, one inch deep in the center and essentially flat over the outer inch of its diameter.

The apparatus was operated under three conditions:

| Distance from Bottom of First Member to Disk | Disk RPM |
| --- | --- |
| ¼ Inch | 1725 |
| ½ Inch | 2425 |
| 1 Inch | 2425 |

Figure 6:
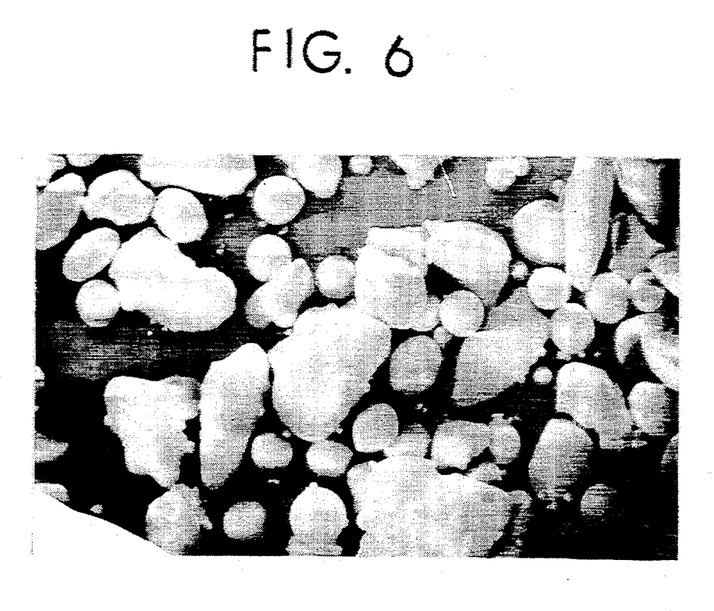
FIG. 6 illustrates an SEM photomicrograph of particles coated pursuant to Example 1.
Figure 7:
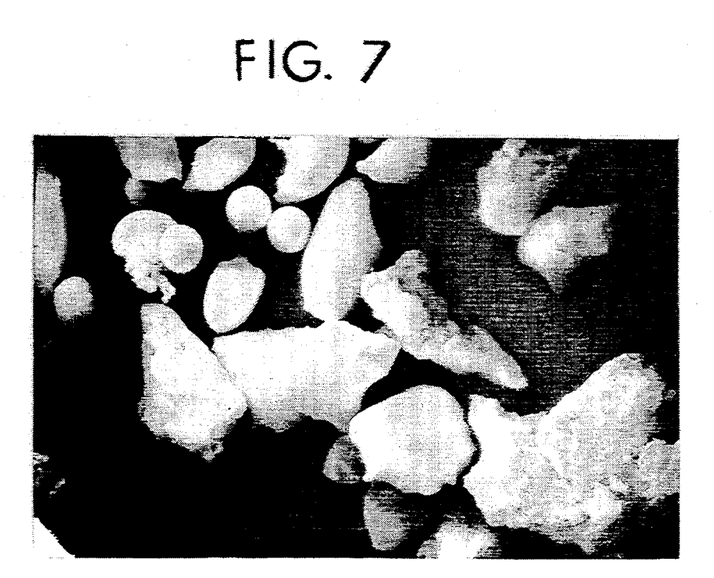
FIG. 7 illustrates an SEM photomicrograph of particles coated pursuant to a prior art method.

Scanning electron microscopy (SEM) of the particles showed a very high quality coating with few uncoated particles. FIG. 6 sets forth SEM photomicrographs at 21.0× magnification of the particles. FIG. 7 sets forth SEM photomicrographs at 20.0× magnification of particles coated using a prior art technique by directing a stream of wax into the center of the disk and a powder feeder was used to distribute the flavor particles around the center. The coating for the particles using the present invention was judged to be a great improvement over a coating created using the above described prior art technique.

EXAMPLE NO. 2

The extruded flavor particles used in Example No. 1 were coated with xylitol. The molten xylitol was maintained at 230° F. and sprayed through the same Nordson spray apparatus of Example No. 1 except the air pressure was set to 35 psi.

The third member was again set to 5 inches above the bottom of the first member and the first member was positioned ⅜" above the disk. The feeder was again set to 250 and as before, a vibrator was attached to the cylinder. Dry Flow starch (from National Starch) was spread onto the collection paper to prevent sticking.

The disk speed was set to 1725 RPM and the coating process was run for 3 minutes.

SEM examination of the coated product indicated very good coating. It is speculated that adding a small amount of water (less than 30%) to the xylitol might reduce sticking to collection surfaces.

EXAMPLE NO. 3

A 20% Aspartame extrusion encapsulation with polyvinylacetate was prepared according to the method of U.S. Pat. No. 5,198,251; 0.3% magnesium stearate was added to the mixed feed materials to improve feeding into the extruder. The extruded material was ground and sized to 44 to 420 microns; about 92% of the material was in this size range with about 7% being finer.

This starting material was coated with a 17% solution of Grayslake 300 Bloom Gelatin. The gelatin was prepared at 85° C. The solution was sprayed through a Nordson model 64B solution sprayer with air pressure set to 25 psi using a Nordson #002006 nozzle. The sprayer was heated to 83° C.

The PVAc/aspartame ingredient was fed from the feeder set to 190. The apparatus and rotating disk of the present invention, illustrated in FIG. 3, were set up as in Example No. 2 except that the disk speed was set to 1075 RPM.

Dry Flow starch was again used and the capsules were allowed to set up overnight before collection.

Figure 8:
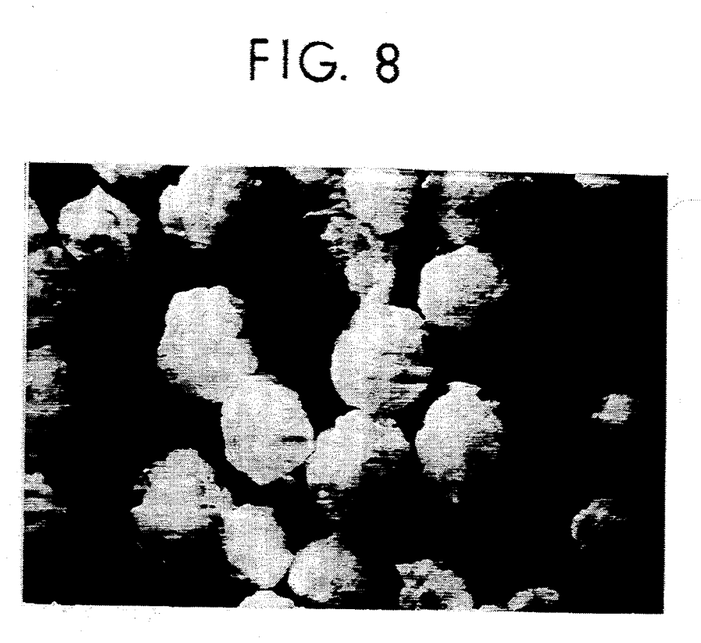
FIG. 8 illustrates an SEM photomicrograph of particles coated pursuant to Example 3.

FIG. 8 sets forth SEM photomicrographs at 24.1× magnification of an agglomeration of particles and gelatin. The agglomeration had a high quality coating.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. An apparatus for use in coating a first material with a second material comprising:
   a first member, the first member including a top opening and a bottom opening;
   a second member located at least partly within the first member, the second member including a bottom opening and a closed top portion;
   a feeder for feeding the first material through the top opening of the first member; and
   a second feeder, including portions located within an interior of the second member, the second feeder and apparatus being so constructed and arranged so that the second material will contact the first material, the second feeder being coupled to means for heating the second material.

2. An apparatus for use in coating a top material with a second material comprising:
   a first member, the first member including a top opening and a bottom opening;
   a second member located at least partly within the first member, with portions of the second member extending through the top opening of the first member, the second member including a bottom opening and a closed top portion;
   a feeder for feeding the first material through the top opening of the first member; and
   a second feeder, including portions located within an interior of the second member, for feeding the second material so that it will contact the first material.

3. The apparatus of claim 2 wherein the first member has an elongated cylindrical shape.

4. The apparatus of claim 2 wherein the second member has a cone shape.

5. The apparatus of claim 2 wherein the first member has a generally elongated cylindrical structure including a flared portion that defines the bottom opening.

6. The apparatus of claim 2 wherein the first member and second member include apertures for receiving a feed line coupled to the second feeder.

7. The apparatus of claim 5 wherein the second feeder includes a spray nozzle.

8. An apparatus for use in coating a first material with a second material comprising:
- a first member, the first member including a top opening and a bottom opening;
- a second member located at least partly within the first member, the second member including a bottom opening and a closed top portion;
- a feeder for feeding the first material through the top opening of the first member;
- a second feeder, including portions located within an interior of the second member, for feeding the second material so that it will contact the first material; and
- including means for wiping a portion of an interior wall of the first member.

9. The apparatus of claim 8 wherein the means for wiping includes at least one blade that rotates around the portion of the interior wall of the first member.

10. An apparatus for use in coating a first material with a second material comprising:
- a first member, the first member including a top opening and a bottom opening;
- a second member located at least partly within the first member, the second member including a bottom opening and a closed top portion;
- a feeder for feeding the first material through the top opening of the first member;
- a second feeder, including portions located within an interior of the second member, for feeding the second material so that it will contact the first material; and
- a third member located at least partly within the second member, the third member having an interior and defining a bottom opening, the second feeder being located so as to be in fluid communication with the interior of the third member, the third member is so constructed and arranged to be vertically adjustable with respect to the first member.

11. The apparatus of claim 10 wherein the third member has a substantially truncated cone shape.

12. An apparatus for use in coating a first material with a second molten material comprising:
- an elongated cylindrical member having a top opening and a bottom opening;
- a second member located at least partially within the elongated cylindrical member having a substantially cone shape including a bottom opening, wherein portions of the second member extend through the top opening of the elongated cylindrical member;
- a feeder for feeding the first material through the top opening; and
- a feeder for feeding the second material, so that it will contact the first material, located at least partially within the second member.

13. The apparatus of claim 12 wherein the elongated cylindrical member has a generally elongated cylindrical structure including a flared portion that defines the bottom opening.

14. The apparatus of claim 12 including means for wiping a portion of an interior of the elongated cylindrical member.

15. The apparatus of claim 12 wherein the elongated cylindrical member and second member include apertures for receiving a feed line coupled to the feeder for feeding the second material.

16. The apparatus of claim 12 wherein the feeder for feeding the second material includes a spray nozzle.

17. An apparatus for use in coating a first material with a second molten material comprising:
- an elongated cylindrical member having a top opening and a bottom opening;
- a second member located at least partially within the elongated cylindrical member having a substantially cone shape including a bottom opening;
- a feeder for feeding the first material through the top opening;
- a feeder for feeding the second material located at least partially within the second member; and
- a third member located at least partly within the second member, the third member having an interior and defining a bottom opening, the feeder for feeding the second material being located so as to be in fluid communication with the interior of the third member, wherein the third member is so constructed and arranged to be vertically adjustable with respect to the elongated cylindrical member.

* * * * *